United States Patent
Muta et al.

(10) Patent No.: US 6,284,368 B2
(45) Date of Patent: *Sep. 4, 2001

(54) PHOTOPOLYMERIZABLE COMPOSITION, PRESSURE-SENSITIVE FLAME-RETARDANT ADHESIVE, AND ADHESIVE SHEETS

(75) Inventors: Shigeki Muta; Takao Yoshikawa; Masahiro Oura, all of Ibaraki (JP)

(73) Assignee: Nitto Denko Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,075
(22) PCT Filed: Mar. 17, 1997
(86) PCT No.: PCT/JP97/00846
  § 371 Date: Sep. 21, 1999
  § 102(e) Date: Sep. 21, 1999
(87) PCT Pub. No.: WO97/38021
  PCT Pub. Date: Oct. 16, 1997

(30) Foreign Application Priority Data

Apr. 4, 1996 (JP) .......................................................... 8-82393

(51) Int. Cl.$^7$ ................. C08F 2/44; C08F 2/50; C08F 220/10; C09J 7/02
(52) U.S. Cl. ................. 428/355 AC; 428/345; 428/920; 428/921; 522/182; 525/163; 525/479
(58) Field of Search ............. 428/355 AC, 345, 428/920, 921; 522/182; 525/163, 479

(56) References Cited

U.S. PATENT DOCUMENTS

Re. 32,249 * 9/1986 Esmay .................................... 428/40
4,788,091 * 11/1988 Rossitto et al. ............... 427/208.2 X

FOREIGN PATENT DOCUMENTS

| 144148A | * 6/1985 | (EP) . |
| 61-500974 | 5/1986 | (JP) ................................. C08F/2/50 |
| 2-202504 | 8/1990 | (JP) ............................... C08F/220/14 |

OTHER PUBLICATIONS

JP 01223187A Patent Abstract, Sep. 1989.*

Brochure—entitled: Flame Retardancy of Polymer, published Apr. 4, 1992, 4 pages (in Japanese), with partial English translation (1 page).

* cited by examiner

*Primary Examiner*—Daniel Zirker
(74) *Attorney, Agent, or Firm*—Sughrue, Mion, Zinn, Macpeak & Seas, PLLC

(57) ABSTRACT

Adhesive sheets using an acrylic pressure-sensitive flame-retardant adhesive having excellent properties such as adhesive force and holding power at high temperature and also having a self fire-extinguishing property which instantaneously extinguishes fire, i.e., a flame-retardance, are provided. A photopolymerizable composition comprising a) 100 parts by weight of a monomer (or the oligomer thereof) comprising 70 to 100% by weight of a (meth)acrylic acid alkyl ester having on the average a carbon number of 2 to 14 in the alkyl group and 30 to 0% by weight of a monoethylenically unsaturated monomer copolymerizable with the ester, b) 0.02 to 5 parts by weight of a polyfunctional (meth)acrylate as a crosslinking agent, c) 0.01 to 5 parts by weight of a photopolymerization initiator, and d) 10 to 180 parts by weight of a flame retardant having a melting point of at least 60° C. is prepared, a pressure-sensitive flame-retardant adhesive is prepared from the photopolymerized product of the composition, and the adhesive is formed on one or both surfaces of a substrate.

6 Claims, No Drawings ated Japanese patent application

PHOTOPOLYMERIZABLE COMPOSITION, PRESSURE-SENSITIVE FLAME-RETARDANT ADHESIVE, AND ADHESIVE SHEETS

TECHNICAL FIELD

The present invention relates to a pressure-sensitive flame-retardant adhesive required to have a sufficient adhesive force and also a self fire-extinguishing property for instantaneously extinguishing fire in the fields of fixation of electronic parts, building materials, vehicles, aircraft, ships, etc.; adhesive sheets formed by forming the pressure-sensitive flame-retardant adhesive into, for example, a sheet form or a tape form; and a photopolymerizable composition for obtaining the pressure-sensitive flame-retardant adhesive.

BACKGROUND ART

An acrylic pressure-sensitive adhesive has generally been prepared by solution-polymerizing monomers mainly comprising a (meth)acrylic acid alkyl ester. However, from the restrictions on safety of organic solvents and environmental health, a method of preparing the pressure-sensitive adhesive by emulsion-polymerizing or photo-polymerizing the above-described monomers is recently widely used.

Such a pressure-sensitive adhesive is usually that an acrylic adhesive polymer is crosslinked with a crosslinking agent to increase a cohesive force at high temperature, thereby imparting an excellent heat resistance. However, since many of the adhesive components are constituted of combustible materials, there has been a difficulty that the pressure-sensitive adhesive cannot be used in fields of application requiring a flame-retardance together with a heat resistance.

To overcome this difficulty, JP-A-1-223187 (the term "JP-A" as used herein means an "unexamined published Japanese patent application"), for example, discloses a pressure-sensitive flame-retardant adhesive obtained by adding a flame-retardant or a flame-retardant assistant, such as a brominated material, chlorinated paraffin, aluminum hydroxide, antimony trioxide, etc., to a adhesive base polymer such as an acrylic polymer, a synthetic rubber, a natural rubber, etc.

However, it is necessary to add a large amount of a flame-retardant in order to exhibit a sufficient flame retardant effect by such a conventional pressure-sensitive flame-retardant adhesive. In this case, there is a problem that the heat resistance of the pressure-sensitive adhesive is decreased. Further, if the degree of crosslinking of the base polymer, such as a rubber, is increased in order to improve the heat resistance, the adhesive property thereof is decreased, so that it is necessary to add a large amount of a tackifier. In this case, there is a problem that holding power of the adhesive at high temperature is decreased in addition to increase of the cost.

In view of these circumstances, an object of the present invention is to provide an acrylic pressure-sensitive flame-retardant adhesive which has excellent adhesive performances such as adhesive force or holding at high temperature, and also has a self fire-extinguishing property for instantaneously extinguishing fire, that is, a flame-retardance; adhesive sheets obtained by forming the pressure-sensitive flame-retardant adhesive in, for example, a sheet form or a tape form; and a photopolymerizable composition for obtaining the above-described pressure-sensitive flame-retardant adhesive.

DISCLOSURE OF THE INVENTION

As a result of various investigations to attain the above-described object, the present inventors have found that if a photopolymerizable composition comprising a (meth)acrylic acid alkyl ester as a main component and a specific crosslinking agent added thereto together with a photopolymerization initiator, and a specific flame-retardant further compounded therewith is polymerized and cured by irradiation with ultraviolet rays, a pressure-sensitive flame-retardant adhesive having excellent adhesive performances such as adhesive force and holding power at high temperature and also a self fire-extinguishing property for instantaneously extinguishing fire, that is, a flame-retardant property, and the adhesive sheets thereof are obtained, and have accomplished the present invention.

That is, the present invention relates to a photopolymerizable composition comprising following components a) to d);

a) 100 parts by weight of monomer(s) (or an oligomer thereof) comprising 70 to 100% by weight of a (meth)acrylic acid alkyl ester having on the average a carbon number of 2 to 14 in the alkyl group, and 30 to 0% by weight of a monoethylenically unsaturated monomer, b) 0.02 to 5 parts by weight of a polyfunctional (meth)acrylate as a crosslinking agent, c) 0.01 to 5 parts by weight of a photopolymerization initiator, and d) 10 to 180 parts by weight of a flame-retardant having a melting point of at least 60° C.;

a pressure-sensitive frame-retardant adhesive comprising the photopolymerization product of this composition; and adhesive sheets having the layer of the pressure-sensitive flame-retardant adhesive on one surface or both surfaces of a substrate.

In the monomer of the component a) used in the present invention, the (meth)acrylic acid alkyl ester having on the average a carbon number of 2 to 14 in the alkyl group includes ethyl (meth)acrylate, butyl (meth)acrylate, isoamyl (meth)acrylate, n-hexyl (meth)acrylate, 2-ethylhexyl (meth)-acrylate, iso-octyl (meth)acrylate, isononyl (meth)acrylate, decyl (meth)acrylate, dodecyl (meth)acrylate, and the like. Those can be used alone or as a mixture of two or more kinds of them.

If necessary, together with the (meth)acrylic acid alkyl ester, a monoethylenically unsaturated monomer copolymerizable with the (meth)acrylic acid alkyl ester is used to improve adhesive property, cohesive force, heat resistance, etc. Such a monoethylenically unsaturated monomer includes acrylic acid, itaconic acid, sulfopropyl acrylate, hydroxyalkyl acrylate, cyanoalkyl acrylate, acrylamide, substituted acrylamide, vinylcaprolactam, acrylonitrile, 2-methoxyethyl acrylate, glycyl acrylate, vinyl acetate, etc., and according to the purpose, those are used alone or as a mixture of two or more kinds.

In the monomer of the component a), the use proportion of the (meth)acrylic acid alkyl ester and the monoethylenically unsaturated monomer copolymerizable therewith is that the former is from 70 to 100% by weight, and preferably from 85 to 95% by weight, and the latter is from 30 to 0% by weight, and preferably from 15 to 5% by weight. By using such a use proportion, the adhesive property, the cohesive force, etc., can be balanced well.

The polyfunctional (meth)acrylate as the crosslinking agent which is the component b) used in the present invention functions to increase shear strength of the adhesive. Examples thereof include trimethylolpropane tri(meth)

acrylate, pentaerythritol tetra(meth)acrylate, 1,2-ethylene glycol di(meth)acrylate, 1,6-hexanediol di(meth)acrylate, etc.

The amount of this polyfunctional (meth)acrylate used is from 0.02 to 5 parts by weight, and preferably from 0.1 to 3 parts by weight, per 100 parts by weight of the monomer as the component a). Within this range, where a bifunctional (meth)acrylate is used, the amount thereof can be increased, and where a trifunctional or more (meth)acrylate is used, the amount thereof can be decreased. However, when the amount is less than 0.02 part by weight, the degree of crosslinking after the photopolymerization cannot sufficiently be increased and when the amount is larger than 5 parts by weight, there is the possibility of lowering the adhesive force, etc., which are either undesirable.

The photopolymerization initiator as the component c) used in the present invention includes benzoin ethers such as benzoin methyl ether, benzoin isopropyl ether, etc; substituted benzoin ethers such as anizoin methyl ether, etc; substituted acetophenones such as 2,2-diethoxyacetophenone, 2,2-dimethoxy-2-phenoneacetophenone, etc.; substituted α-ketols such as 2-methyl-2-hydroxypropiophenone, etc.; aromatic sulfonyl chlorides such as 2-naphthalenesulfonyl chloride, etc.: photoactive oximes such as 1-phenone-1,1-propanedione-2-(o-ethoxycarbonyl)oxime, etc.

The photopolymerization initiator is used in an amount of from 0.01 to 5 parts by weight, and preferably from 0.05 to 1 part by weight, per 100 parts by weight of the monomer as the component a). If the amount thereof is less than 0.01 part by weight, the monomer tends to remain largely, while if the amount is more than 5 parts by weight, the molecular weight of the polymer is decreased and the cohesive force of the adhesive tends to decrease.

The flame retardant as the component d) used in the present invention has a melting point of at least 60° C., and preferably at least 80° C. A bromine-based flame retardant is particularly preferred. If a flame retardant having a melting point of lower than 60° C. is used, holding characteristics of the photopolymerizable composition at high temperature are decreased. Also, a chlorine-based flame retardant is undesirable because the composition generates a gas such as hydrogen chloride, etc., at high temperature, causing the possibility of corrosion of electronic parts.

Examples of the bromine-based flame retardant having a melting point of at least 60° C. include propylene-modified tetrabromobisphenol A, a carbonyl-modified tetrabromobisphenol A oligomer, decabromodiphenyl ether, hexabromobenzene, penta-bromotoluene, hexabromocyclododecane, etc.

The flame retardant is used in an amount of from 10 to 180 parts by weight, preferably from 15 to 150 parts by weight, and more preferably from 20 to 100 parts by weight, per 100 parts of the monomer as the component a). If the amount of the flame retardant is less than 10 parts by weight, the flame retardance is decreased, and if the amount thereof is more than 180 parts by weight, the adhesive properties are decreased. In addition, conventional flame retardant assistants such as antimony trioxide, etc., may be used together with the above-described flame retardant.

The photopolymerizable composition of the present invention comprises the above-described components a) to d) as essential components. For preparing the photopolymerizable composition, the monomer as the component a) is mixed with the photopolymerization initiator as the component c) and the premix is partially polymerized to form a coatable syrup form having a viscosity of from about 50 to 5,000 centipoise. Further, the above-described premix of the monomer and the photopolymerization initiator may be mixed with a thixotropic agent such as fumed silica to form a coatable syrup form.

The syrup form mixture thus obtained is then mixed with the polyfunctional (meth)acrylate as the crosslinking agent of the component b), the flame retardant having a melting point of at least 60° C. as the component d), and, if necessary, an additional photopolymerization initiator to prepare a photopolymerizable composition. This composition can further contain, if necessary, conventional additives such as a filler, an antioxidant, a tackifying resin, etc., in the range of not inhibiting the photopolymerization by irradiation with ultraviolet rays.

In the present invention, the photopolymerizable composition thus prepared is irradiated with ultraviolet rays to form a photopolymerized product. The irradiation with ultraviolet rays is carried out in an oxygen-free atmosphere replaced with an inert gas such as nitrogen, etc., or in the state of being intercepted from air by covering with an ultraviolet transmittable film. The ultraviolet rays are an electromagnetic radiation having a wavelength range of from about 180 to 460 nm. An electromagnetic radiation having a wavelength longer than or shorter than the above-described range. The ultraviolet source used is a general illuminator such as a mercury arc lamp, a carbon arc lamp, a low-pressure mercury lamp, an intermediate-pressure or high-pressure mercury lamp, a metal halide lamp, etc. The intensity of the ultraviolet rays can appropriately be set up by controlling the distance to a material to be irradiated or by controlling the voltage. However, in view of the irradiation time (productivity), it is desirable to use a weak light having an intensity of from 0.1 to 7 $mW/cm^2$.

In the photopolymerized product after irradiation with ultraviolet rays, unreacted monomers usually remain in an amount of from about 1 to 5% by weight. The residual monomers are volatilized in using the adhesive at high temperature to cause blister of the adhesive surface or contamination with a gas, thereby causing decrease of the cohesive force. Therefore, it is generally desirable to remove the residual monomers by heat-drying after the irradiation with ultraviolet rays. The heat-drying is usually carried out using a drying furnace, but it is particularly preferable to carry out the heat-drying using a hot blast-circulating drying furnace having a far infrared heater. The reason for this is that drying can be conducted with good efficiency in a short period of time by heating from the inside with the far infrared heater and by the diffusion from the surface due to the circulating hot blast. The heat-drying treatment is generally conducted at a temperature of from about 100 to 150° C. for several tens of second to several minutes although varying depending on the capacity of the drying furnace.

The photopolymerized product thus obtained has a sufficiently high molecular weight and also has a high degree of crosslinking such that the inside of the product is crosslinked with the crosslinking agent as the component b) and the solvent-insoluble content is at least 50% by weight, and preferably from 70 to 95% by weight.

The present invention makes such a photopolymerized product into the pressure-sensitive flame-retardant adhesive. The adhesive has excellent adhesive force and holding power, in particular, has excellent holding power at high temperature and good heat resistance, and also has a high self fire-extinguishing property, that is, high flame retardance, due to the above-described molecular weight and degree of crosslinking.

The adhesive sheets of the present invention are prepared by forming such a pressure-sensitive flame-retardant adhesive having excellent heat resistance on one surface or both surfaces of a substrate usually having a thickness of about 25 to 125 μm such that the thickness of one layer of the adhesive is usually about 10 to 150 μm, thereby forming into a tape form or a sheet form.

The substrate used is a porous material such as a non-woven fabric or a paper, and various kinds of plastics. In particular, for a heat-resistant use, heat-resistant films such as a polyamide film, a polyester film, polytetrafluoroethylene film, a polyether ketone film, a polyether sulfone film or polymethylpentene film; flame-retardant films or non-woven fabrics; and metal foils such as a copper foil or aluminum foil are preferably used as a heat-resistant substrate.

Such adhesive sheets are produced, for example, as follows. A layer of the pressure-sensitive flame-retardant adhesive having excellent heat resistance is formed on a releasing liner, and the layer is transferred onto one surface or both surfaces of the substrate; alternatively, the substrate is directly coated or impregnated with the photopolymerizable composition without using the releasing liner. The layer thus formed is irradiated with ultraviolet rays to form a photopolymerized product, and the layer is dried by heating to form the layer of the pressure-sensitive flame-retardant adhesive having excellent heat resistance. An appropriate method can be used depending on the kind of the substrate used.

BEST MODE FOR PRACTICING THE INVENTION

The present invention is described in more detail below by referring to the following examples. In the examples and the comparative examples, all parts are by weight unless otherwise indicated.

EXAMPLE 1

A premix composed of 60 parts of isononyl acrylate, 28 parts of n-butyl acrylate, 12 parts of acrylic acid, and 0.1 part of 2,2-dimethoxy-2-phenylacetone (photopolymerization initiator) was partially polymerized by exposing it to ultraviolet rays in a nitrogen gas atmosphere to prepare a coatable syrup having a viscosity of 4,500 centipoise. 0.2 Part of trimethylolpropane triacrylate (crosslinking agent), 30 parts of propylene-modified tetrabromobisphenol A (FG-3100, trade name, made by Teijin Limited, melting point: 90 to 105° C.) (flame retardant) and 10 parts of antimony trioxide (flame retardant assistance) were added to 100 parts by the syrup to prepare a photopolymerizable composition.

This photopolymerizable composition was coated on a substrate composed of a polyimide film having a thickness of 25 μm, and the layer coated was subjected to a photopolymerization treatment by irradiating with ultraviolet rays from a high-pressure mercury lamp having an intensity of 5 mW/cm$^2$ at 900 mj/cm$^2$ in a nitrogen gas atmosphere. The photopolymerized layer was then dried at 130° C. for 5 minutes with a hot blast circulating dryer to form a layer of a pressure-sensitive flame-retardant adhesive having a thickness of 50 μm. Thus an adhesive sheet was prepared.

EXAMPLE 2

A photopolymerizable composition was prepared in the same manner as in Example 1 except that a carbonyl-modified tetrabromobisphenol A oligomer (FG-8100, trade name, made by Teijin Limited, melting point: 165 to 180° C.) was used as the flame retardant. Further, using this photopolymerizable composition, an adhesive sheet was prepared in the same manner as in Example 1.

EXAMPLE 3

A photopolymerizable composition was prepared in the same manner as in Example 1 except that a premix composed of 90 parts of 2-ethylhexyl acrylate, 10 parts of acrylic acid, and 0.1 part of 2,2-dimethoxy-2-phenylacetone (photopolymerization initiator) was used. Further, using this photopolymerizable composition, an adhesive sheet was prepared in the same manner as in Example 1.

EXAMPLE 4

A photopolymerizable composition was prepared in the same manner as in Example 3 except that a carbonyl-modified tetrabromobisphenol A oligomer (FG-8100, trade name, made by Teijin Limited, melting point: 165 to 180° C.) was used as a flame retardant. Further, using this photopolymerizable composition, an adhesive sheet was prepared in the same manner as in Example 1.

Comparative Example 1

A photopolymerizable composition was prepared in the same manner as in Example 1 except that 30 parts of the flame retardant (propylene-modified tetrabromobisphenol A) and 10 parts of the flame retardant assistant (antimony trioxide) were not used. Further, using this photopolymerizable composition, an adhesive sheet was prepared in the manner as in Example 1.

Comparative Example 2

A photopolymerizable composition was prepared in the same manner as in Example 1 except that 50 parts of chlorinated paraffin (ENPARA 40, trade name, made by AJINOMOTO CO., INC., liquid at normal temperature (i.e., melting point: lower than normal temperature)) was used as the flame retardant and 20 parts of antimony trioxide was used as the flame retardant assistant. Further, using this photopolymerizable composition, an adhesive sheet was prepared in the same manner as in Example 1.

Comparative Example 3

90 Parts of 2-ethylhexyl acrylate, 10 parts of acrylic acid, 210 parts of ethyl acetate, and 0.4 part of 2,2-azobis-isobutyronitrile were charged with a flask. After sufficiently replacing the atmosphere in the system with a nitrogen gas, a solution polymerization was conducted by heating to a temperature of from 60 to 80° C. with stirring. An acrylic polymer solution having a viscosity of 120 poises, a conversion of 99.2% by weight, and a solid content of 31.4% by weight was obtained.

2.0 Parts of a polyfunctional isocyanate compound (crosslinking agent), 30 parts of propylene-modified tetrabromobisphenol A (FG-3100, trade name, made by Teijin Limited, melting point: 90 to 105° C.) (flame retardant) and 10 parts by antimony trioxide (flame retardant assistant) were added to 100 parts of the acrylic polymer solution to form a pressure-sensitive flame-retardant adhesive. This adhesive was coated on a substrate composed of a polyimide film having a thickness of 25 μm. After drying the coated layer at 40° C. for 5 minutes in a hot blast dryer, the coated layer was further dried at 130° C. for 5 minutes to form a layer of the pressure-sensitive flame-retardant adhesive having a thickness of 50 μm. Thus an adhesive sheet was prepared.

The adhesive sheets obtained in Examples 1 to 4 and Comparative Examples 1 to 3 were examined for adhesive force, holding power (shear holding power), and flame retardance in the following manners. The measurement results are shown in Table 1 below.

Adhesive Force

The adhesive sheet was cut into a width of 20 mm to prepare a test piece. Using a stainless steel plate as an adherent, 180 degree releasing was performed according to JIS Z 1522, and the adhesive force (g/20 mm width) in this case was measured.

Holding Power

The adhesive sheet was cut into a width of 10 mm to prepare a test piece. This test piece was adhered to an aluminum plate such that the adhered area was 20 mm×10 mm. The assembly was allowed to stand for 30 minutes at 80° C. A load of 500 g was applied to the end of the test piece, and the time of falling by slipping was measured. The mark (*) in Table 1 shows that in the measurement, the layer of the pressure-sensitive flame-retardant adhesive caused cohesive failure and fell down.

Flame Retardance Test

According to a thin material vertical combustion test method of UL-94, combustion time of the adhesive sheet was determined.

TABLE 1

| | Adhesive force (g/20 mm width) | Holding power (80° C.) | Flame retardance (Flame retardant time) (sec) |
| --- | --- | --- | --- |
| Example 1 | 950 | 200 or more | 2 |
| Example 2 | 850 | 200 or more | 5 |
| Example 3 | 900 | 200 or more | 2 |
| Example 4 | 800 | 200 or more | 5 |
| Comparative Example 1 | 1,010 | 200 or more | 52 |
| Comparative Example 2 | 1,100 | 5* | 10 |
| Comparative Example 3 | 650 | 5* | 5 |

As is apparent from the results shown in Table 1, it cam be seen that in Examples 1 to 4, pressure-sensitive flame-retardant adhesives which have excellent adhesive force and holding power and also have a flame retardance, and the adhesive sheets using the adhesives are obtained by irradiating the photopolymerizable compositions with ultraviolet rays, but in Comparative Examples 1 to 3, the samples obtained are poor in at least one of the adhesive force, the holding power and the flame-retardance.

INDUSTRIAL APPLICABILITY

As described above, the present invention can provide a pressure-sensitive flame-retardant adhesive and the adhesive sheets thereof, which have excellent adhesive properties such as adhesive force, holding power, etc., and also have a self fire-extinguishing property which instantaneously extinguishes fire, by using a (meth)acrylic acid alkyl ester as the main component, compounding a photopolymerization initiator, a specific crosslinking agent and a specific flame retardant with the ester to prepare a photopolymerizable composition, and polymerizing and curing the composition by irradiating it with ultraviolet rays. Those can suitably be used in the field requiring a high flame-retardance and a strong adhesive property, such as fixation of electronic parts, building materials, vehicles, aircraft, ships, etc.

What is claimed is:

1. A photopolymerizable composition comprising
    a) 100 parts by weight of a monomer (or the oligomer thereof) comprising 70 to 100% by weight of a (meth)acrylic acid alkyl ester having on the average a carbon number of 2 to 14 in the alkyl group, and 30 to 0% by weight of a monoethylenically unsaturated monomer copolymerizable with the (meth)acrylic acid alkyl ester;
    b) 0.02 to 5 parts by weight of a polyfunctional (meth)acrylate as a crosslinking agent;
    c) 0.01 to 5 parts by weight of a polymerization initiator; and
    d) 10 to 180 parts of a bromine-based flame retardant having a melting point of at least 60° C.

2. A pressure-sensitive flame-retardant adhesive comprising a photopolymerization product of a photopolymerization composition comprising
    a) 100 parts by weight of a monomer (or oligomer thereof) comprising 70 to 100% by weight of a (meth)acrylic acid alkyl ester having on the average a carbon number of 2 to 14 in the alkyl group, and 30 to 0% by weight of a monoethylenically unsaturated monomer copolymerizable with the (meth)acrylic acid alkyl ester;
    b) 0.02 to 5 parts by weight of a polyfunctional (meth)acrylate as a crosslinking agent;
    c) 0.01 to 5 parts by weight of a polymerization initiator; and
    d) 10 to 180 parts of a bromine-based flame retardant having a melting point of at least 60° C.

3. The pressure-sensitive flame-retardant adhesive as claimed in claim 2, wherein the adhesive has a solvent-insoluble content of at least 50% by weight.

4. An adhesive sheet comprising a substrate having formed on one surface or both surfaces thereof a layer comprising a pressure-sensitive flame-retardant adhesive comprising a photopolymerized product of a photopolymerizable composition comprising
    a) 100 parts by weight of a monomer (or oligomer thereof) comprising 70 to 100% by weight of a (meth)acrylic acid alkyl ester having on the average a carbon number of 2 to 14 in the alkyl group, and 30 to 0% by weight of a monoethylenically unsaturated monomer copolymerizable with the (meth)acrylic acid alkyl ester;
    b) 0.02 to 5 parts by weight of a polyfunctional (meth)acrylate as a crosslinking agent;
    c) 0.01 to 5 parts by weight of a polymerization initiator; and
    d) 10 to 180 parts of a bromine-based flame retardant having a melting point of at least 60° C.

5. The adhesive sheet as claimed in claim 4, wherein the substrate is a heat-resistant substrate.

6. The adhesive sheet as claimed in claim 4, wherein the adhesive has a solvent-insoluble content of at least 50% by weight.

\* \* \* \* \*